United States Patent [19]

Stuhlmacher, II

[11] Patent Number: 5,331,837
[45] Date of Patent: Jul. 26, 1994

[54] VEHICLE DOOR ALIGNMENT DEVICE

[76] Inventor: Glen Stuhlmacher, II, 45 Cuenca Ct., San Ramon, Calif. 94583

[21] Appl. No.: 71,310

[22] Filed: Jun. 2, 1993

[51] Int. Cl.$^5$ .............................................. B21D 1/12
[52] U.S. Cl. ........................................ 72/458; 72/705
[58] Field of Search .......................... 72/308, 458, 705

[56] References Cited

U.S. PATENT DOCUMENTS

| 1,775,968 | 9/1930 | Nelson | 72/458 |
| 4,399,683 | 8/1983 | Hunter | 72/458 |
| 4,930,337 | 6/1990 | Schaap | 72/705 |

OTHER PUBLICATIONS

Advertizing Publication for *STECK Door Aligning Bar,* Part No. 21840, Steck Mfg. Co., 1115 S. Broadway, Dayton OH 45408.

*Primary Examiner*—Lowell A. Larson

[57] ABSTRACT

Apparatus for aligning an associated vehicle door with the cooperating portions of a vehicle body having a lever on an adjustable stand which can be hooked under the vehicle or held separately from the vehicle for alignment of doors that are fully open. The lever carries a hooked head that engages in a latch of the door, or any other known latch engaging devices. The head is attached to the lever by a bolt, and the distance between the head and lever can be adjusted to fit doors with outer walls that extend variable lengths. A plate is threaded onto the bolt between the head and the lever, and after the head is engaged in the latch, the plate is rotated to clamp against a surface of the door outside the latch.

20 Claims, 2 Drawing Sheets

VEHICLE DOOR ALIGNMENT DEVICE

BACKGROUND OF THE INVENTION

1. Field of the Invention

The present invention relates to a tool used for alignment of a door in a vehicle.

2. Description of the Prior Art

The alignment of a door in a motor vehicle is typically accomplished by applying force to the door until an area at or near the door hinges is bent and the door is aligned. U.S. Pat. No. 4,399,683 discloses a vehicle door aligning tool that is comprised of a lever that attaches at a first axial location to a lock pin on a door jamb of an associated vehicle body, the lever attaching at a second axial location to an associated door lock of an associated door. Also known to the applicant is a tool much like that described in the above referenced patent, the main differences being that the non-patented tool engages in the door lock by means of a loop rather than a shoulder bolt, has a means for engaging the door lock which is pivotally attached to the lever, and is accompanied by a pair of shims for use at the engagement of the tool with the door lock.

While the above referenced prior art teaches of devices for aligning vehicle doors, several problems exist with those devices.

First, the engagement of the devices taught by the prior art with the door lock leaves some play between the devices and the door lock. Due to this play the devices tend to pivot around the door lock with which they are engaged, when they are used to pry upward or downward the door in order to bend the metal hinges of the door or the area surrounding the hinges. This pivoting can cause damage to the lock, which on occasion may cause the door to open during use, endangering the vehicle's occupants. The surface of the door surrounding the lock, typically made of metal, may be bent by the device or the paint on that surface may be damaged. Vehicle identification numbers and computerized bar codes, both of which are modernly glued on to the door surface near the lock, may also be damaged thwarting their uses.

Second, the tendency of the devices to pivot when used to force a door up or down also causes difficulties to the operator of the devices, as he or she is forced to apply torque to the lever to attempt to avoid the damages mentioned above.

Third, the play between the devices and the door lock makes it difficult for the operator to gauge the amount of adjustment being provided to the door hinge area, resulting in misalignment and repeated adjustments.

Fourth, the prior art devices only allow alignment of the door in a vertical direction with the door almost closed, and do not provide any means for vertical adjustment of the door while it is fully open, which can be needed with any vehicle, and is commonly needed with many modern cars.

Fifth, the prior art teaches no means for dealing with large variations in the distance that the outside wall of the door extends beyond the door lock in the direction away from the door hinges. The doors of many vehicles, especially minivans, have outside walls that extend so far beyond the door lock that a door alignment device used for an average car door will not work on there doors, as the device cannot simultaneously engage in the door lock and the lock pin of the associated vehicle and avoid the outside wall.

STATEMENT OF THE OBJECTS

It is an object of the present invention to provide a vehicle door alignment tool that does not damage the door lock, latch, or the area of the door surrounding the door lock or latch.

It is another object of the present invention to provide a door alignment tool that does not require the operator to apply a compensating torque to avoid damaging the door lock, latch, or at the area surrounding the door lock or latch.

It is another object of the present invention to provide a door alignment tool that can engage in any vehicle door latch of common use, regardless of the type of lock pin that fits into that door latch or the length that the outside wall of the door extends beyond the latch.

It is yet another object of the present invention to provide a door alignment tool for which the adjustments made with the tool are not difficult to gauge due to play between the tool and the door latch or lock.

Finally, it is yet another object of the present invention to provide a door alignment tool that can provide a vertical adjustment of a door with the door either fully open or almost closed, or at any amount of door opening between those extremes.

SUMMARY OF THE INVENTION

The present invention accomplishes these objectives and others that will become apparent to those skilled in the art by providing a novel hook that can engage in a door lock or latch of any modern vehicle known to the applicant. The invention also discloses novel spin locking clamp that firmly holds the hook, or other devices for engagement in a vehicle door lock, eliminating play between the alignment tool and door that can damage the door surface, lock or latch or cause difficulty to the operator of alignment tool. The bolt is set at an angle to match the angle of opening of the door, and the bolt is of a length that can be adjusted to allow the hook or other door engagement devices to engage in a door lock or latch without damaging an outer wall of the door, despite typically large variations in length of the outer wall. All of these advances can be combined in a vehicle door alignment tool involving a lever on a stand, the lever holding a door lock engagement and clamping device mentioned above, the stand having a rotatable fork that can be hooked on a pinch weld located under the associated vehicle, thereby avoiding damage to the vehicle near a lock pin, the stand also able to be operated independently of the associated vehicle, thereby allowing adjustments of the door with the door open any desired or necessary amount.

The above elements may be utilized in combination or separately. For example, the hook, spin locking clamp and angled, variable length bolt can be used with a lever that engages in a lock pin of an associated vehicle, rather than with the lever attached to a stand.

DESCRIPTION OF THE PREFERRED EMBODIMENT

Figure 1:
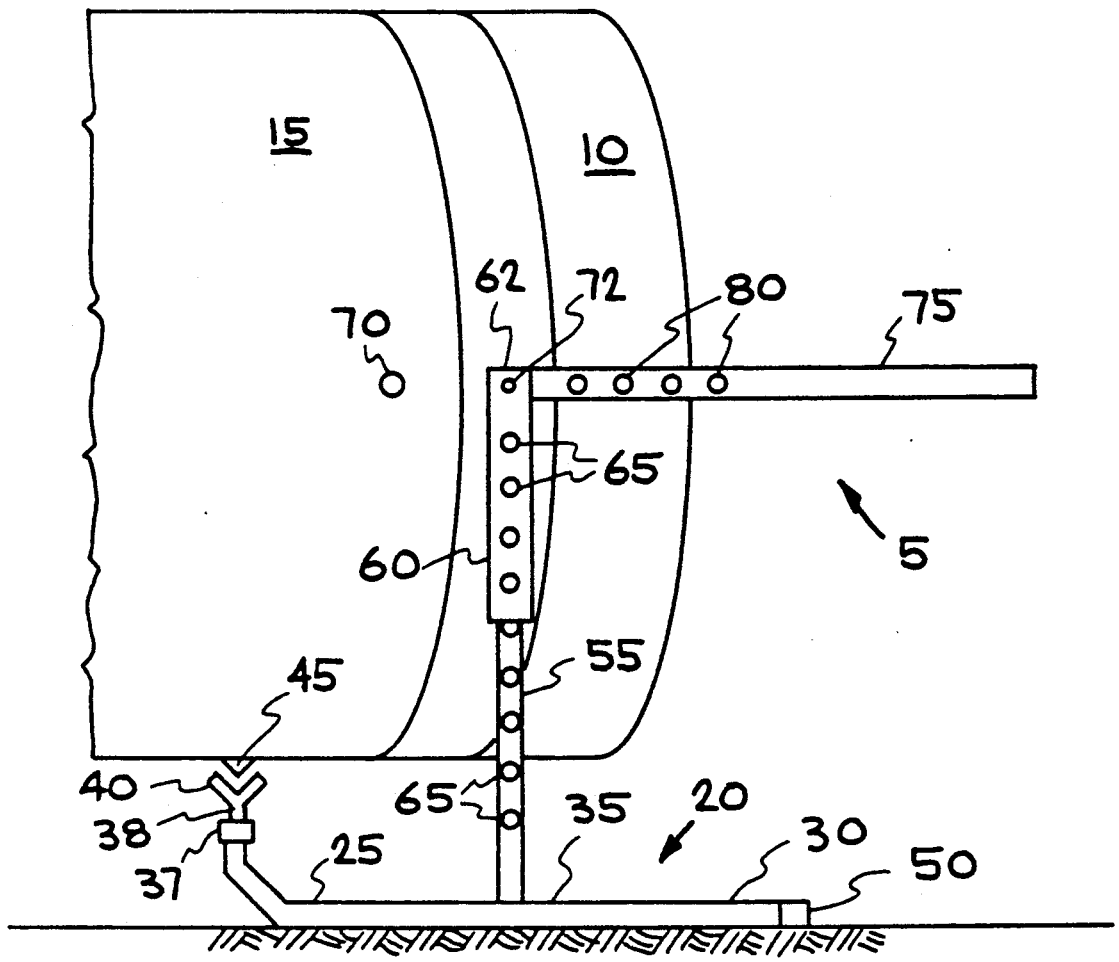
FIG. 1 is a side view diagram of a preferred embodiment of the invention.

Referring now to FIG. 1, a door alignment tool 5 is shown positioned next to the end of a door 10 that is ajar from an associated vehicle 15 with which it is to be aligned. The door alignment tool 5 can be seen to include a foot 20 having a front end 25, a rear end 30, and a roughly straight shaft 35 between those ends. The front end 25 is shown to bend upward, terminating in a cylindrical sleeve 37 which houses a shaft 38 from which a fork 40 protrudes, the shaft 38 rotatably attached to the sleeve 37. The fork 40 fits a pinch weld 45 that runs under the sides of most modern vehicles, and is able to rotate in a horizontal plane to enable the door alignment tool 5 to engage in the end of the door 10 at various angles that the door can be opened. The sleeve 37 has a collar that prevents the shaft 38 from sliding out of the sleeve. To the rear end 30 a bar 50 is rigidly attached, the bar being generally normal to the shaft 35 and lying in a plane that includes the shaft, the plane being generally normal to the upward direction in which the front end 25 tends to arch.

Also generally normal to the plane containing the shaft 35 and the bar 50 is a stand 55 that is rigidly attached to the shaft. The stand 55 is slidably encased within a sheath 60 having a top 62, the stand and sheath both containing a series of holes 65 that may be aligned with each other to adjust the height of the tool. The sheath 60 is adjusted until the top is at about the level of a lock pin 70 for the door 10. Once the desired height is selected, a pin is inserted through a matching pair of holes 65 in the stand and sheath so as to fix the tool to the approximate height desired. It should be noted that any known means for varying this height and locking the selected height in place can be used instead of the stand 55, sheath 60, holes 65 and lock pin 70 described above.

Pivotally connected to the top 62 by a pin 72 is a lever 75, which is able to rotate only in a plane that contains the stand 55 and the shaft 35. The top 62 is notched on sides not holding the pin 72 so as to allow the lever 75 freedom to rotate. The lever 75 contains several threaded cylindrical apertures 80 spaced successively from the pin 72, the apertures each having an axis that is generally parallel to an axis about which the lever 75 rotates.

Figure 2:
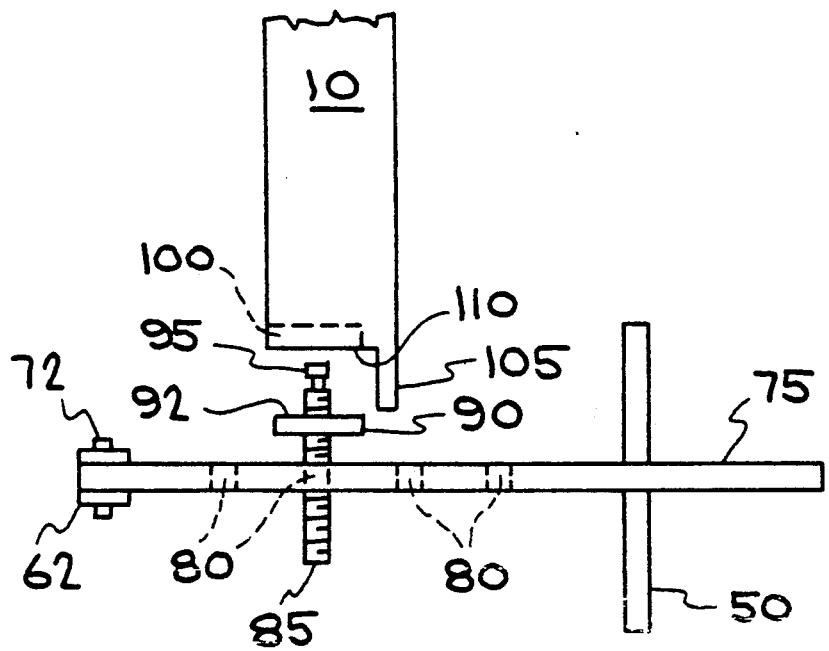
FIG. 2 is a top view diagram of the preferred embodiment of the invention shown in FIG. 1.

Referring now to FIG. 2, a top view diagram of the device 5 and the door 10 can be seen. A bolt 85 is threaded into one of the apertures 80 in the lever 75. A cylindrical plate 90 having a flat front surface 92, an axis normal to that surface and an axial threaded cylindrical aperture is threaded on the bolt 85 between the lever 75 and a head 95 that fits into a latch 100 on the door 10. The surface 92 of the plate is coated with a material such as rubber or plastic that will not scratch the paint of the door. After the head 95 is engaged in the latch 100 the plate 90 is spun on the bolt until it presses firmly on an end surface 110 of the door 10.

The bolt 85 is threaded into the lever 75 a distance far enough to ensure that the lever avoids contact with an outside wall 105 of the door 10. The tool 5 is thus easily able to accommodate doors having outside walls of various lengths. The coated plate 90 clamps the end surface 110 of the door 10 tightly, avoiding the damage and difficulty of use prevalent in the prior art. The foot 20 rests on a floor, thereby providing support for lifting the door 10 with the lever 75, which is perhaps the most common type of adjustment, as doors often tend to sag. Support for downward adjustment of the door can come either from resting the fork 40 in the pinch weld 45 or standing on the shaft 35. The pinch weld 45 is commonly used for jacking cars and is further removed from view than the lock pin 70; using the pinch weld for support during alignment is therefore less likely to result in noticeable damage than using the lock pin.

The most commonly needed adjustment is accomplished with the door nearly closed, however it can be seen that the present invention can also be used on a door that is fully open, unlike the prior art. Adjustment of a fully open door is increasingly necessary with modern vehicles, as the gap at the juncture between the front outside wall of some vehicle doors and the outside wall of their associated vehicle bodies (the crack in the outside surface of the vehicle located just outside the door hinges when the door is closed) is made smaller. As an example of the smallness of this gap, some car advertisements display a small ball-bearing that rolls along various gaps of that car. This small gap in the outside wall at the door hinge can cause binding between the wall of the door and the wall of the vehicle that prevents adjustment while the door is nearly closed, or conversely, allows such adjustment only at the expense of damaging the wall of the door or the vehicle, or both. This conflict between the wall of the door and that of the vehicle is compounded by the fact that alignment of the door usually requires the door to be forced beyond the desired position of alignment so that the door becomes aligned when the force is removed and the door moves back to a relaxed position.

Figure 3:
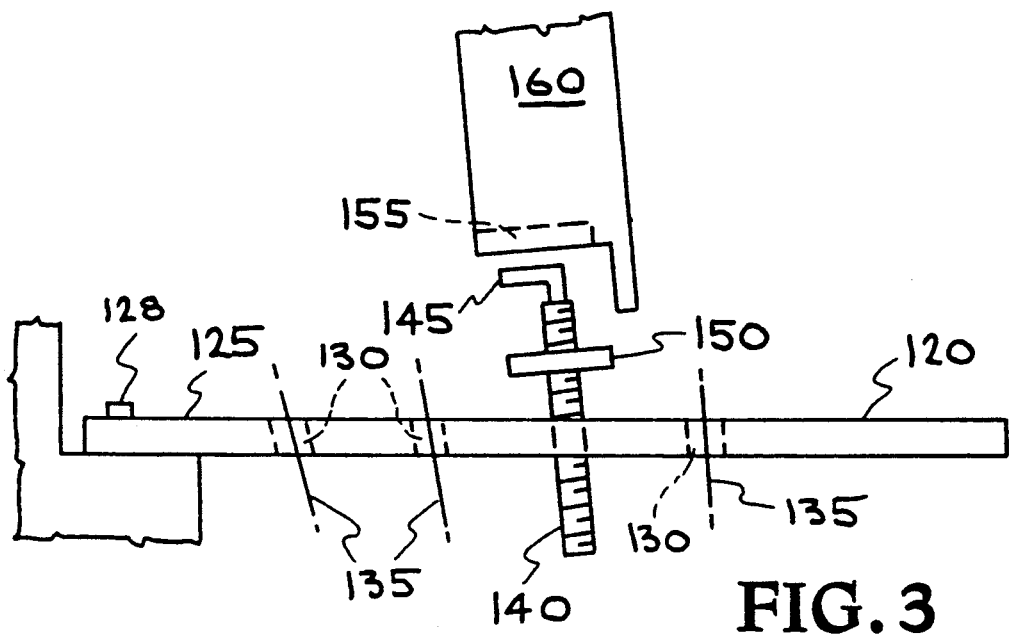
FIG. 3 is a top view diagram of another preferred embodiment of this invention.

Although the support offered by the floor and the pinch weld can be seen to have advantages over that of the lock pin, some of the elements of the present invention can also be used to improve prior art devices that use lock pins for support. Referring now to FIG. 3, a top view of a lever 120 is shown having an end 125 that can be hooked on a lock pin 130 via either a circular aperture or a pair of oppositely disposed arcuate apertures, as disclosed in the prior art. The lever 120 contains several threaded cylindrical apertures 130, each aperture having an axis 135 that is angled slightly away from normal to the lever, so as to more accurately align with a door that is open at a slight angle. The several apertures 130 offer a variety of angles to fit a variety of door lengths, although it turns out that the angle does not vary greatly, due to little variation in door lengths and the small angle that a door is open during this type of alignment.

A threaded bolt 140 having a head 145 is threaded into one of the apertures 130. As in the previous embodiment, a plate 150 containing a threaded cylindrical aperture has been threaded on to the bolt 140. After the head has engaged in a latch 155 of a door 160, the plate is rotated on the bolt 140 until the door is firmly clamped, at which time the door can be aligned. It should be noted that while the plate 150 allows the door 160 to be rigidly attached to the lever 120 in a direction that suffered from an undesirable torque in the previous embodiments, the lever is still free to rotate relative to the door in a direction necessary for alignment, as the bolt 140 is free to rotate in the aperture 128.

Figure 4:
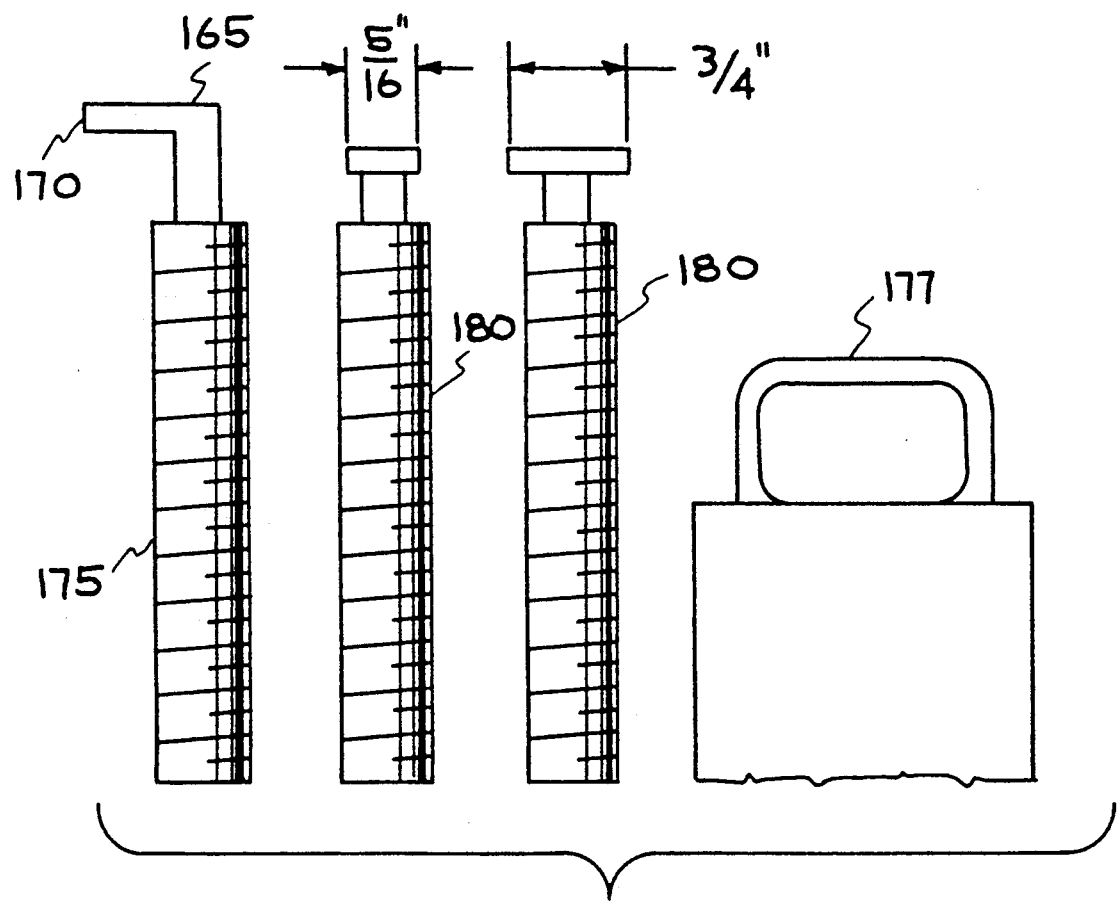
FIG. 4 is a diagram of yet another preferred embodiment of this invention.

Referring now to FIG. 4, another preferred embodiment of the present invention is shown. A hooked head 165 is shown having an elongated lip 170 that projects at an angle approximately normal to an axis of a bolt 175 to which the head 165 is attached. Many modern vehicles do not have a lock pin such as that described in U.S. Pat. No. 4,399,683, instead utilizing a loop 177 that engages in a specialized door latch and lock. As a result, the apparatus described in U.S. Pat. No. 4,399,683 is incapable of aligning those doors. The hooked head 165 is especially useful in helping a door latch that is designed to receive a loop 177 to fully close. The other prior art known to the applicant, as described above, contains a loop that is able to engage in the latch and lock of some of those doors, but is difficult to engage in the latch or lock of a door for which the associated vehicle contains a lock pin.

The hooked head also has other advantages over the other door lock engagement devices known to the applicant. First, since it is attached to a long, threaded bolt 175, it is able to engage in doors having outside walls of various lengths. Second, since the lip 170 is disposed off the axis of the bolt 175 the hooked head easily engages in a door lock or latch, as the non-axial lip 170 is free to rotate and follow the axial portion of the head 165 into the latch or lock. This novel, self-aligning head 165 thereby averts the misalignment that can occur when the fixed loop is inserted into a latch or lock.

In addition to the hooked head 165, a series of shoulder bolts having heads varying in diameter by 1/16 increments, from 5/16 inch to ¾ inch diameter is provided by the present invention in order to firmly clamp a latch or lock of a door. An example of two of these bolts 180 is shown in FIG. 4.

The foregoing description and drawings were given for illustrative purposes only, it being understood that the invention is not limited to the embodiments disclosed, but is intended to embrace any and all alternatives, equivalents, modifications and rearrangements as defined by the following claims.

Having described the invention, what is claimed is:

1. A device for aligning an associated vehicle door with an associated vehicle body comprising:
   a stand of adjustable height having a top and a bottom, the bottom having a foot with a means for securing the stand against vertical movement,
   a lever with an end pivotally attached to the top of the stand,
   a means carried on the lever for engaging a latch of the door,
   a means carried on the lever for clamping the latch engaging means to the door.

2. A device according to claim 1, wherein the means carried on the lever for engaging a latch of the door includes:
   a threaded bolt which is seated in a threaded aperture in the lever, the bolt having a head which is hooked in a latch of the door, the bolt of a length greater than that which an outside wall of the door extends beyond the door latch.

3. A device according to claim 2, wherein the means carried on the lever for clamping the latch engaging means includes:
   a plate having a face which presses upon a surface of the door near the door latch after the head of the bolt has engaged in the latch, the face held against the door surface by the bolt having a head which is hooked in the latch.

4. A device according to claim 3, wherein the head terminates in a lip which protrudes in a direction generally normal to an axis of the head and bolt.

5. A device according to claim 4, wherein the plate contains a threaded aperture which is threaded onto the bolt between the lever and the head.

6. A device according to claim 5, wherein the foot is elongated, having a front end, a back end and a midsection which is affixed in a generally normal direction to the bottom of the stand, the foot directed generally in a plane in which the lever pivots, the front end bent upward and holding a rotatably attached fork which is splayed upward, the rear end terminating in a bar that is generally normal to both the shaft and the straight section, whereby the stand can be secured against upward movement by either hooking the fork in a pinch weld of the associated vehicle or standing upon the foot, and the stand can be secured against downward movement by a surface supporting the foot, the rotation of the fork allowing the lever to align with the door at varying angles that the door is opened.

7. A device according to claim 6, wherein the means carried on the lever for engaging a latch of the door further includes a plurality of bolts having heads of a range of sizes.

8. A device according to claim 7, wherein the face which presses upon a surface of the door is comprised of a material which is softer than the paint of the door.

9. A device according to claim 8, wherein the lever contains several threaded apertures spaced along the lever.

10. In a device for aligning an associated vehicle door with an associated vehicle body having a lever, a means carried at a first axial location on the lever for engaging a lock pin on the door jamb of the associated vehicle body, and a means carried on the lever at a second axial location for engaging an associated door lock of the associated door, the improvement which comprises:
    a means for positioning an element of the device that engages with the door lock,
    a means for clamping the device to the door.

11. An improvement according to claim 10, wherein the means for clamping the device to the door includes a plate having a face which presses upon an end of the door, the plate held by the element of the device engaged in the door lock.

12. An improvement according to claim 11, wherein means for positioning an element of the device that engages with the door lock includes:
    a threaded bolt that is longer than the greatest distance that an outside wall of the door commonly extends beyond the door lock, the bolt attached to the element,
    an aperture in the lever into which the bolt can be threaded a variable distance, whereby the element can be engaged and the lever can avoid contact with end walls of doors that extend various lengths beyond the door lock.

13. An improvement according to claim 12, wherein the means for clamping the device to the door includes the plate having an aperture which is threaded on the bolt between the element and the lever, whereby the plate can be rotated to tighten against the end of the door.

14. An improvement according to claim 13, wherein means for positioning an element of the device that engages with the door lock includes having the aperture in the lever oriented at an angle generally matching an angle that the door is open during alignment.

15. An improvement according to claim 14, wherein the means for clamping the device to the door includes a head on the bolt that terminates in a lip which protrudes in a direction generally perpendicular to an axis of the bolt, the head and lip of sizes that fit in the door latch.

16. An improvement according to claim 15, wherein means for positioning an element of the device that engages with the door lock includes having a plurality of apertures in the lever oriented at a variety of angles generally matching various angles that the door is opened during alignment.

17. An improvement according to claim 16, wherein the face which presses upon the door lock is made of a material which is softer than the paint of the door.

18. An improvement according to claim 17, wherein the means for clamping the device to the door includes a plurality of bolts having heads of a range of sizes that fit a range of door latches.

19. An apparatus for attachment to a vehicle door comprising:
a bolt with a head attached, the head having a lip at an end distal to the bolt protruding in a direction generally perpendicular to the head, the head and lip fitting within a latch of the door, whereby the head and lip can engage the latch,
a means for connecting devices to the bolt,
a means for clamping the bolt to the door.

20. The apparatus of claim 19, wherein the bolt is threaded, and the means for clamping the bolt to the door includes a plate having a hole which is threaded onto the bolt, the plate having a generally flat surface on a side proximate to the head, the surface composed of a material that is softer than most vehicle paint.

* * * * *